US010717833B2

(12) United States Patent
Bilgen et al.

(10) Patent No.: US 10,717,833 B2
(45) Date of Patent: Jul. 21, 2020

(54) METHODS OF PREPARING A PEELABLE SEAL LAYER

(71) Applicant: Dow Global Technologies LLC, Midland, MI (US)

(72) Inventors: Mustafa Bilgen, Freeport, TX (US); Claudia Hernandez, Freeport, TX (US); Marcello Tognola, Tarragona (ES)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/564,276

(22) PCT Filed: May 9, 2016

(86) PCT No.: PCT/US2016/031415
§ 371 (c)(1),
(2) Date: Oct. 4, 2017

(87) PCT Pub. No.: WO2017/003558
PCT Pub. Date: Jan. 5, 2017

(65) Prior Publication Data
US 2018/0134858 A1    May 17, 2018

(30) Foreign Application Priority Data

Jun. 30, 2015  (EP) .................................... 15382349

(51) Int. Cl.
| | | |
|---|---|---|
| *C08J 5/18* | (2006.01) | |
| *B32B 27/32* | (2006.01) | |
| *C08L 23/06* | (2006.01) | |
| *B32B 7/06* | (2019.01) | |
| *B32B 27/08* | (2006.01) | |
| *B32B 27/30* | (2006.01) | |
| *B32B 27/36* | (2006.01) | |
| *B32B 7/12* | (2006.01) | |
| *B32B 27/16* | (2006.01) | |
| *B29C 48/23* | (2019.01) | |
| *B32B 37/15* | (2006.01) | |
| *B29C 48/21* | (2019.01) | |

(Continued)

(52) U.S. Cl.
CPC ................ *C08J 5/18* (2013.01); *B29C 48/23* (2019.02); *B32B 7/06* (2013.01); *B32B 7/12* (2013.01); *B32B 27/08* (2013.01); *B32B 27/16* (2013.01); *B32B 27/302* (2013.01); *B32B 27/306* (2013.01); *B32B 27/308* (2013.01); *B32B 27/32* (2013.01); *B32B 27/36* (2013.01); *B32B 37/153* (2013.01); *C08L 23/06* (2013.01); *B29C 48/08* (2019.02); *B29C 48/21* (2019.02); *B29K 2023/0633* (2013.01); *B29K 2023/12* (2013.01); *B29K 2995/0098* (2013.01); *B32B 2255/10* (2013.01); *B32B 2255/26* (2013.01); *B32B 2270/00* (2013.01); *B32B 2274/00* (2013.01); *B32B 2307/31* (2013.01); *B32B 2307/50* (2013.01); *B32B 2307/514* (2013.01); *B32B 2307/718* (2013.01); *B32B 2307/72* (2013.01); *B32B 2307/748* (2013.01); *B32B 2323/046* (2013.01); *B32B 2325/00* (2013.01); *B32B 2439/46* (2013.01); *B32B 2439/70* (2013.01); *C08J 2323/06* (2013.01); *C08J 2423/06* (2013.01); *C08J 2423/12* (2013.01); *C08L 2203/162* (2013.01); *C08L 2205/025* (2013.01); *C08L 2205/03* (2013.01); *C08L 2207/066* (2013.01)

(58) Field of Classification Search
None
See application file for complete search history.

(56) References Cited

U.S. PATENT DOCUMENTS

| | | |
|---|---|---|
| 3,645,992 A | 2/1972 | Dow |
| 3,914,342 A | 10/1975 | Mitchell |

(Continued)

FOREIGN PATENT DOCUMENTS

| | | |
|---|---|---|
| WO | 03/040442 A1 | 5/2003 |
| WO | 2003/043816 A1 | 5/2003 |

(Continued)

OTHER PUBLICATIONS

PCT/US2016/031415, International Search Report and Written Opinion dated Jan. 11, 2018.

(Continued)

*Primary Examiner* — Robert T Butcher

(57) ABSTRACT

The present invention provides methods of preparing peelable seal layers, methods of preparing multilayer films, peelable seal layers made therefrom, and multilayer films made therefrom. In one aspect, a method of preparing a peelable seal layer comprises (a) providing a first blend comprising (i) from 5 to 98 percent by weight of a reactor grade propylene based plastomer or elastomer having a molecular weight distribution of less than 3.5 and a density of less than 0.89 g/cc and (ii) from 2 to 95 percent by weight of a second polymer selected from the group consisting of polyethylene, polybutylene, and styrenic polymer and mixtures thereof; (b) providing at least one linear low density polyethylene; (c) blending the first blend with the at least one linear low density polyethylene to obtain a second blend; and (d) extruding the second blend to form a peelable seal layer, wherein the peelable seal layer has a heat seal initiation temperature less than 120° C. when sealed at a bar pressure of 40 psi with a dwell time of 0.5 seconds.

13 Claims, No Drawings

(51) Int. Cl.
*B29C 48/08* (2019.01)
*B29K 23/00* (2006.01)

(56) References Cited

U.S. PATENT DOCUMENTS

| | | | |
|---|---|---|---|
| 4,076,698 | A | 2/1978 | Anderson et al. |
| 4,599,392 | A | 7/1986 | McKinney et al. |
| 5,272,236 | A | 12/1993 | Lai et al. |
| 5,278,272 | A | 1/1994 | Lai et al. |
| 5,582,923 | A | 12/1996 | Kale et al. |
| 5,733,155 | A | 3/1998 | Sagawa et al. |
| 5,854,045 | A | 12/1998 | Fang et al. |
| 6,010,588 | A | 1/2000 | Stahl et al. |
| 6,590,034 | B2 | 7/2003 | Wanic et al. |
| 7,863,383 | B2 | 1/2011 | Gibbons et al. |
| 2007/0009753 | A1* | 1/2007 | Sato .................. B32B 7/06 428/523 |
| 2008/0255296 | A1* | 10/2008 | Gibbons .................. B32B 7/06 524/528 |
| 2013/0245201 | A1* | 9/2013 | Mezghani ........... C08L 23/0815 525/240 |

FOREIGN PATENT DOCUMENTS

| | | |
|---|---|---|
| WO | 2010/043084 A1 | 4/2010 |
| WO | 2010/110791 A1 | 9/2010 |
| WO | 2014/100386 A1 | 6/2014 |
| WO | 2015/077901 A1 | 6/2015 |

OTHER PUBLICATIONS

PCT/US2016/031415, International Preliminary Report on Patentability dated Jul. 27, 2016.
Tamfer A product information sheet, Feb. 2015, pp. 1-27.
NOVA presentation, Feb. 2015, pp. 1-4.

* cited by examiner

METHODS OF PREPARING A PEELABLE SEAL LAYER

FIELD

The present invention relates generally to methods of preparing peelable seal layers, to methods of preparing multilayer films, and to peelable seal layers and multilayer films made therefrom. Such peelable seal layers can be provide heat sealable and peelable seals as well as tamper evident peelable seals.

BACKGROUND

Heat sealable and peelable films (also referred to herein as "peelable seals') are employed on a large scale for temporarily closing containers that include, for example, food products or medical devices. During use, a consumer tears away the peelable film. To gain consumer acceptance, a number of characteristics associated with a heat sealable and peelable film are desired. For example, the film should provide a leak-proof closure of the container or bag. To seal a bag, heat sealing is commonly used. Various apparatus have been constructed for the purpose of forming bags while simultaneously filling the bags with the desired contents. These apparatus are commonly known as vertical form-fill-and-seal and horizontal form-fill-and-seal machines.

These machines typically have forming collars or bars that shape a flat piece of film into a tubular shape of a bag. Hot metal sealing jaws are moved from an open position to a closed position, contacting the film in order to seal it into a bag shape. During the sealing process, the outer layer of the film comes into direct contact with the hot metal surface of the sealing jaws. Heat is thus transferred through the outer layer of the film to melt and fuse the inner sealant layer to form a seal. Generally, the outer layer has a higher melting temperature than the inner sealant layer. As such, while the inner sealant layer is melted to form a seal, the outer layer of the film does not melt and is not stuck to the sealing jaws. After the sealing jaws reopen, the film is cooled to room temperature.

Before the inner sealant layer is cooled to room temperature, it should be able to maintain its seal integrity. The ability of an adhesive or sealant layer to resist creep of the seal while it is still in a warm or molten state is generally referred to as "hot tack." To form a good seal, the hot tack of the sealable and peelable film should be adequate.

Besides adequate hot tack, it is also desirable to have a low heat seal initiation temperature which helps to ensure fast packaging line speeds and a broad sealing window which could accommodate variability in process conditions, such as pressure and temperature. A broad sealing window also enables high speed packaging of heat sensitive products, as well as, provides a degree of forgiveness for changes in packaging or filling speeds.

In addition to the "sealable" characteristic of a sealable and peelable film, it should also have a desired "peelable" characteristic needed to provide an easily openable seal on a package or bag. Peelability generally refers to the ability to separate two materials or substrates in the course of opening a package without compromising the integrity of either of the two. The force required to pull a seal apart is called "seal strength" or "heat seal strength" which can be measured in accordance with ASTM F88-94. The desired seal strength varies according to specific end user applications. For flexible packaging applications, such as cereal liners, snack food packages, cracker tubes and cake mix liners, the seal strength desired is generally in the range of about 1-4 pounds per inch. For example, for easy-open cereal box liners, a seal strength in the range of about 1-3 pounds per inch is commonly specified, although specific targets vary according to individual manufactures requirements. In addition to flexible packaging application, a sealable and peelable film can also be used in rigid package applications, such as lids for convenience items (e.g., snack food such as puddings) and medical devices. Typical rigid packages have a seal strength of about 1-5 pounds per inch. The seal layer can be on the lid or on the container or both.

Additional desired characteristics for a heat sealable and peelable film include a low coefficient of friction and good abuse resistance. A low coefficient of friction ensures that the sealant layer can be processed smoothly and efficiently on fabrication and packaging equipment and is particularly important for vertical form-fill-and-seal packaging. Good abuse resistance and toughness is desired, for example, in cereal box liners to withstand tears and punctures from irregularly-shaped, rigid cereals. Additional characteristics include taste and odor performance and barrier or transmission properties.

In some applications, it is important to be able to identify when the package has been unsealed as, for example, it may indicate when a package has been the subject of tampering.

Heat sealable and peelable films are generally made from one or more polymeric resins. The resulting characteristics of a heat sealable and peelable film depend largely upon the type of the resins used to form the film. For example, ethylene vinyl acetate (EVA) and ethylene methyl acrylate (EMA) copolymers provide excellent heat sealing properties. However, the seals produced with these copolymers are such that separation usually cannot be achieved without damage to the film. To alleviate this problem, polybutylene is mixed with an EVA polymer to produce a heat sealable and peelable film. Although the peelability of the film is improved, the heat sealable and peelable film has some unpleasant odor due to the presence of EVA. In addition to using polybutylene, some ionomers, such as SURLYN®, is mixed with EVA to produce a heat sealable and peelable film. While the film is peelable, it causes stringiness or "angel hair" upon separation of the film. Moreover, ionomers are generally expensive and may have some odor as well.

Additionally, typical EVA-polybutylene based peelable seal systems "age up" in seal strength. The seal strength increases as time elapses after seal formation. This is seen as a disadvantage of these systems because seals that are secure at the time the package is formed increase in strength prior to reaching the consumer, making the packages more difficult for the consumer to open.

U.S. Pat. No. 6,590,034 describes peelable seals made from a mixture of two immiscible polymers which form a continuous phase and a discontinuous phase wherein the absolute value of the shear viscosity differential of the two polymers is less than 100%. Although many potential materials are covered, this reference focuses on the use of homopolymer polypropylene as the discontinuous phase.

Although a number of resins systems have been employed to make a heat sealable and peelable film, there continues to exist a need for an improved cost-effective heat sealable and peelable film with desired seal strength during processing and transportation as well as during package opening by the end consumer. It is desirable that the resin system used to produce the heat sealable and peelable film has a relatively lower seal initiation temperature and a relatively broad heat sealing window. It is also desirable that the heat sealable and peelable film is relatively age-resistant and has a relatively lower coefficient of friction and good abuse resistance and toughness.

U.S. Pat. No. 7,863,383 describes blends of from about 5 to about 98 percent by weight propylene based elastomers or plastomers with a particular second polymer from a group preferably consisting of polyethylene and styrenic polymers, which would have a seal strength in the range that would make them particularly well suited for use as a peelable seal. It would be desirable to have further improved resins for use in peelable seal applications.

SUMMARY

It has been discovered that existing sealant resins can be modified to adjust final peel strength by blending in a linear low density polyethylene (LLDPE). This discovery permits film extruders to advantageously fine tune the final peel strength of a film based on a particular application's requirements without having to design an entirely new sealant resin. In other words, according to some embodiments of the present invention, a film extruder can tune the peel strength of a film by in-line blending a LLDPE with a sealant resin.

In one aspect, the present invention provides a method of preparing a peelable seal layer that comprises (a) providing a first blend comprising (i) from 5 to 98 percent by weight of a reactor grade propylene based plastomer or elastomer having a molecular weight distribution of less than 3.5 and a density of less than 0.89 g/cc and (ii) from 2 to 95 percent by weight of a second polymer selected from the group consisting of polyethylene, polybutylene, and styrenic polymer and mixtures thereof; (b) providing at least one linear low density polyethylene; (c) blending the first blend with the at least one linear low density polyethylene to obtain a second blend; and (d) extruding the second blend to form a peelable seal layer, wherein the peelable seal layer has a heat seal initiation temperature less than 120° C. when sealed at a bar pressure of 40 psi with a dwell time of 0.5 seconds.

In another aspect, the present invention provides a method of preparing a multilayer film that comprises (a) providing a polymeric resin comprising polyethylene; (b) providing a blend for a peelable seal layer formed by (1) providing a first blend comprising (i) from 5 to 98 percent by weight of a reactor grade propylene based plastomer or elastomer having a molecular weight distribution of less than 3.5 and a density of less than 0.89 g/cc; and (ii) from 2 to 95 percent by weight of a second polymer selected from the group consisting of polyethylene, polybutylene, and styrenic polymer and mixtures thereof; (2) providing at least one linear low density polyethylene; and (3) blending the first blend with the at least one linear low density polyethylene to obtain the peelable seal layer blend; and (c) coextruding the polymeric resin and the peelable seal layer blend to obtain a multilayer film, wherein the peelable seal layer has a heat seal initiation temperature less than 120° C. when sealed at a bar pressure of 40 psi with a dwell time of 0.5 seconds.

These and other embodiments are described in more detail in the Detailed Description.

DETAILED DESCRIPTION

The term "polymer", as used herein, refers to a polymeric compound prepared by polymerizing monomers, whether of the same or a different type. The generic term polymer thus embraces the term "homopolymer", usually employed to refer to polymers prepared from only one type of monomer as well as "copolymer" which refers to polymers prepared from two or more different monomers.

The term "low density polyethylene" may also be referred to as "LDPE", "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see for example U.S. Pat. No. 4,599,392, herein incorporated by reference).

The term "linear low density polyethylene" may also be referred to as "LLDPE". LLDPE includes both resin made using the traditional Ziegler-Natta catalyst systems as well as single-site catalysts such as metallocenes (sometimes referred to as "m-LLDPE") and includes linear, substantially linear or heterogeneous polyethylene copolymers or homopolymers. LLDPEs contain less long chain branching than LDPEs and include the substantially linear ethylene polymers which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. No. 3,914,342 or 5,854,045). The LLDPEs can be made via gas-phase, solution-phase or slurry polymerization or any combination thereof, using any type of reactor or reactor configuration known in the art, with gas and slurry phase reactors being most preferred.

The term molecular weight distribution or "MWD" is defined as the ratio of weight average molecular weight to number average molecular weight ($M_w/M_n$). $M_w$ and $M_n$ are determined according to methods known in the art using conventional GPC.

The ratio Mw(absolute)/Mw(GPC) is defined wherein Mw(absolute) is the weight average molecular weight derived from the light scattering area at low angle (such as 15 degrees) and injected mass of polymer and the Mw(GPC) is the weight average molecular weight obtained from GPC calibration. The light scatter detector is calibrated to yield the equivalent weight average molecular weight as the GPC instrument for a linear polyethylene homopolymer standard such as NBS 1475.

"Melt strength" which is also referred to in the relevant art as "melt tension" is defined and quantified herein to mean the stress or force (as applied by a wind-up drum equipped with a strain cell) required to draw a molten extrudate at a haul-off velocity at which the melt strength plateaus prior to breakage rate above its melting point as it passes through the die of a standard plastometer such as the one described in ASTM D1238-E. Melt strength values, which are reported herein in centi-Newtons (cN), are determined using a Gottfert Rheotens at 190° C.

The present invention, in some embodiments, provides methods of preparing peelable seal layers as well as to methods of preparing multilayer films.

In some embodiments, a method of preparing a peelable seal layer comprises (a) providing a first blend comprising (i) from 5 to 98 percent by weight of a reactor grade propylene based plastomer or elastomer having a molecular weight distribution of less than 3.5 and a density of less than 0.89 g/cc and (ii) from 2 to 95 percent by weight of a second polymer selected from the group consisting of polyethylene, polybutylene, and styrenic polymer and mixtures thereof; (b) providing at least one linear low density polyethylene; (c) blending the first blend with the at least one linear low density polyethylene to obtain a second blend; and (d) extruding the second blend to form a peelable seal layer, wherein the peelable seal layer has a heat seal initiation temperature less than 120° C. when sealed at a bar pressure of 40 psi with a dwell time of 0.5 seconds.

In some embodiments, the second blend comprises at least 1% by weight of the linear low density polyethylene. The second blend comprises 20% or less by weight of the linear low density polyethylene in some embodiments. The second blend, in some embodiments, comprises 15% by weight or less of the linear low density polyethylene.

In some embodiments, the first blend and the linear low density polyethylene are dry blended. The first blend and the linear low density polyethylene are melt blended in some embodiments.

In some embodiments, extruding the second blend to form a peelable seal layer comprises coextruding the second blend with at least one polyolefin to form a multilayer film. The at least one polyolefin, in some embodiments, comprises polyethylene.

In some embodiments, the seal layer has a seal strength in the range of 0.5 to 4 lb/in. The seal layer, in some embodiments, has a seal strength in the range of 0.5 to 3 lb/in.

In some embodiments, the second polymer in the first blend is a polyethylene selected from the group consisting of low density polyethylene, linear low density polyethylene, ultra or very low density polyethylene, medium density polyethylene, high density polyethylene, ethylene vinyl acetate copolymers and mixtures thereof. The second polymer, in some embodiments, is a low density polyethylene (LDPE). In some such embodiments, the LDPE comprises 10 to 40 percent by weight of the first blend.

The propylene based elastomer or plastomer, in some embodiments, comprises from 5% to 15% by weight of units derived from ethylene based on the weight of the propylene based elastomer or plastomer. In some embodiments, the first blend further comprises one or more additives from a group comprising antioxidants, ultraviolet light stabilizers, thermal stabilizers, slip agents, antiblock, pigments or colorants, processing aids, crosslinking catalysts, flame retardants, fillers and foaming agents.

Additional details regarding the first blend and the at least one linear low density polyethylene are provided below.

Some embodiments of the present invention relate to peelable seal layers made by any of the methods disclosed herein. Some embodiments of the present invention relate to multilayer films comprising a peelable seal layer made by any of the methods disclosed herein.

In some embodiments, a method of preparing a multilayer film comprises (a) providing a polymeric resin comprising polyethylene; (b) providing a blend for a peelable seal layer formed by (1) providing a first blend comprising (i) from 5 to 98 percent by weight of a reactor grade propylene based plastomer or elastomer having a molecular weight distribution of less than 3.5 and a density of less than 0.89 g/cc; and (ii) from 2 to 95 percent by weight of a second polymer selected from the group consisting of polyethylene, polybutylene, and styrenic polymer and mixtures thereof; (2) providing at least one linear low density polyethylene; and (3) blending the first blend with the at least one linear low density polyethylene to obtain the peelable seal layer blend; and (c) coextruding the polymeric resin and the peelable seal layer blend to obtain a multilayer film, wherein the peelable seal layer has a heat seal initiation temperature less than 120° C. when sealed at a bar pressure of 40 psi with a dwell time of 0.5 seconds.

In some embodiments, the peelable seal layer blend comprises at least 1% by weight of the linear low density polyethylene. The peelable seal layer blend comprises 20% or less by weight of the linear low density polyethylene in some embodiments. The peelable seal layer blend, in some embodiments, comprises 15% by weight or less of the linear low density polyethylene.

In some embodiments, the first blend and the linear low density polyethylene are dry blended. The first blend and the linear low density polyethylene are melt blended in some embodiments.

In some embodiments, the seal layer has a seal strength in the range of 0.5 to 4 lb/in. The seal layer, in some embodiments, has a seal strength in the range of 0.5 to 3 lb/in.

In some embodiments, the second polymer in the first blend is a polyethylene selected from the group consisting of low density polyethylene, linear low density polyethylene, ultra or very low density polyethylene, medium density polyethylene, high density polyethylene, ethylene vinyl acetate copolymers and mixtures thereof. The second polymer, in some embodiments, is a low density polyethylene (LDPE). In some such embodiments, the LDPE comprises 10 to 40 percent by weight of the first blend.

The propylene based elastomer or plastomer, in some embodiments, comprises from 5% to 15% by weight of units derived from ethylene based on the weight of the propylene based elastomer or plastomer. In some embodiments, the first blend further comprises one or more additives from a group comprising antioxidants, ultraviolet light stabilizers, thermal stabilizers, slip agents, antiblock, pigments or colorants, processing aids, crosslinking catalysts, flame retardants, fillers and foaming agents.

Additional details regarding the first blend and the at least one linear low density polyethylene are provided below.

Some embodiments of the present invention relate to multilayer films made by any of the methods disclosed herein.

Turning now to the first blend used in the methods of the present invention, the first blend is a blend of at least two components, which blends are particularly well suited for use as a peelable seal. As set forth herein, the first blend alone can be used to form a peelable seal layer. By subsequently blending a LLDPE as disclosed herein, the peel strength of the peelable seal layer can be fine tuned depending on the requirements for a particular application.

The first component in the first blend is a propylene-based plastomer or elastomer or "PBPE". These materials comprise at least one copolymer with at least 50 weight percent of units derived from propylene and at least 5 weight percent of units derived from a comonomer other than propylene. Suitable propylene based elastomers and/or plastomers are taught in PCT Publication No. WO2003/040442 which is hereby incorporated by reference in its entirety.

Of particular interest for use in the present invention are reactor grade PBPEs having MWD less than 3.5. It is intended that the term "reactor grade" is as defined in U.S. Pat. No. 6,010,588 and in general refers to a polyolefin resin whose molecular weight distribution (MWD) or polydispersity has not been substantially altered after polymerization. The preferred PBPE will have a heat of fusion (as determined using the DSC method described herein) less than 90 Joules/gm, preferably less than 70 Joules/gm, more preferably less than 50 Joules/gm. When ethylene is used as a comonomer, the PBPE has from 3 to 15 percent of ethylene, or from 5 to 14 percent of ethylene, or 7 to 12 percent ethylene, by weight of the propylene based elastomer or plastomer.

Although the remaining units of the propylene copolymer are derived from at least one comonomer such as ethylene, a $C_{4-20}$ α-olefin, a $C_{4-20}$ diene, a styrenic compound and the like, preferably the comonomer is at least one of ethylene and a $C_{4-12}$ α-olefin such as 1-hexene or 1-octene. Preferably, the remaining units of the copolymer are derived only from ethylene.

The amount of comonomer other than ethylene in the propylene based elastomer or plastomer is a function of, at least in part, the comonomer and the desired heat of fusion of the copolymer. If the comonomer is ethylene, then typically the comonomer-derived units comprise not in excess of 15 wt percent of the copolymer. The minimum amount of ethylene-derived units is typically at least 3, preferably at least 5 and more preferably at least 9, wt percent based upon the weight of the copolymer. If the polymer comprises at least one other comonomer other than ethylene, then the preferred composition would have a heat of fusion approximately in the range of a propylene-ethylene copolymer with 3 to 20 wt. percent ethylene. Though not intending to be bound by theory, it is thought that attaining approximately similar crystallinity and crystal morphology is beneficial to achieving similar functionality as a peelable seal.

The propylene based plastomer or elastomer of this invention can be made by any process, and includes copolymers made by Ziegler-Natta, CGC (Constrained Geometry Catalyst), metallocene, and nonmetallocene, metal-centered, heteroaryl ligand catalysis. These copolymers include random, block and graft copolymers although preferably the copolymers are of a random configuration. Exemplary propylene copolymers include Exxon-Mobil VISTAMAXX polymer, and VERSIFY propylene/ethylene elastomers and plastomers by The Dow Chemical Company.

The density of the propylene based elastomers or plastomers of this invention is typically at least 0.850, can be at least 0.860 and can also be at least 0.865 grams per cubic centimeter (g/cm$^3$) as measured by ASTM D-792. Preferably the density is less than 0.89 g/cc.

The weight average molecular weight (Mw) of the propylene based elastomers or plastomers of this invention can vary widely, but typically it is between 10,000 and 1,000,000 (with the understanding that the only limit on the minimum or the maximum $M_w$ is that set by practical considerations). For homopolymers and copolymers used in the manufacture of peelable seals, preferably the minimum Mw is 20,000, more preferably 25,000.

The polydispersity of the propylene based elastomers or plastomers of this invention is typically between 2 and 5. "Narrow polydispersity", "narrow molecular weight distribution", "narrow MWD" and similar terms mean a ratio ($M_w/M_n$) of weight average molecular weight ($M_w$) to number average molecular weight ($M_n$) of less than 3.5, can be less than 3.0, can also be less than 2.8, can also be less than 2.5.

The PBPEs for use in the present invention ideally have an MFR of from 0.5 to 2000 g/10 min, preferably from 1 to 1000, more preferably from 2 to 500, still more preferably from 2 to 40. The particular MFR selected will depend in part on the intended fabrication methods such as blown film, extrusion coating, sheet extrusion, injection molding or cast film processes. MFR for copolymers of propylene and ethylene and/or one or more $C_4$-$C_{20}$ α-olefins is measured according to ASTM D-1238, condition L (2.16 kg, 230 degrees C.). MFRs greater than 250 were estimated according to the following correlation:

$$MFR = 9 \times 10^{18} \, Mw^{-3.3584}$$

Mw (grams per mole) was measured using gel permeation chromatography.

The overall first blends for use in the present invention will comprise a second polymer. Suitable materials for the second polymer may include polyethylene (including low density polyethylene, linear low density polyethylene, very low (or ultra low) density polyethylene, medium density polyethylene and high density polyethylene), polybutylene, general purpose polystyrene ("GPPS") and high impact polystyrene ("HIPS"), graft-modified ethylene polymer, ethylene-styrene interpolymers (ESI), ethylene vinyl acetate interpolymer, ethylene acrylic acid interpolymer, ethylene ethyl acrylate interpolymer, ethylene methacrylic acid interpolymer, ethylene methacrylic acid ionomer, and the like), polycarbonate, thermoplastic polyurethane, polyamide, polylactic acid interpolymer, thermoplastic block polymer (for example styrene butadiene copolymer, styrene butadiene styrene triblock copolymer, styrene ethylene-butylene styrene triblock copolymer and the like), polyether block copolymer (for example, PEBAX), copolyester polymer, polyester/polyether block polymers (for example, HYTREL), ethylene carbon monoxide interpolymer (for example, ethylene/carbon monoxide (ECO), copolymer, ethylene/acrylic acid/carbon monoxide (EAACO) terpolymer, ethylene/methacrylic acid/carbon monoxide (EMAACO) terpolymer, ethylene/vinyl acetate/carbon monoxide (EVACO) terpolymer and styrene/carbon monoxide (SCO)), polyethylene terephthalate (PET), chlorinated polyethylene, and the like and mixtures thereof. Preferred material for the second polymer include the polyethylene and styrenic polymers. The preferred polyethylene materials are LDPE, and HDPE, with LDPE being most preferred for many applications. The preferred styrenic materials are GPPS and HIPS.

Materials such as polystyrene are less miscible (or have a higher degree of incompatibility), and thus less of the second polymer would be required in order to have a peelable seal. When LDPE is used as the second polymer, on the other hand, relatively more of the second polymer is normally necessary.

If LDPE is desired to be used in first blend, then any LDPE may be selected. The preferred LDPE for use in the first blend has a Melt Index ($I_2$) (determined by ASTM D1238, condition 190° C./2.16 kg), of from 0.2 to 100 g/10 min. More preferably the melt index is greater than 0.2, most preferably more than 0.5 g/10 min The melt index is preferably less than 50, more preferably less than 20, and most preferably less than 10 g/10 min. The preferred LDPE will also have a density (as determined in accordance with ASTM D792) in the range of 0.915 to 0.930 g/cc, preferably 0.915 to 0.925 g/cc.

Such preferred LDPE can be made in an autoclave or tubular reactor.

The second component of the first blend may also include LDPE/LDPE blends, for example, blends in which one of the LDPE resins has a relatively higher melt index and the other has a lower melt index and is more highly branched. The component with the higher melt index can be obtained from a tubular reactor, and a lower MI, higher branched, component of the blend may be added in a separate extrusion step or using a parallel tubular/autoclave reactor in combination with special methods to control the melt index of each reactor, such as recovery of telomer in the recycle stream or adding fresh ethylene to the autoclave (AC) reactor, or any other methods known in the art.

Suitable high pressure ethylene polymer compositions for use in preparing the first blend include low density polyethylene (homopolymer), ethylene copolymerized with at least one α-olefin for example butene, and ethylene copolymerized with at least one α,β-ethylenically unsaturated comonomers, for example, acrylic acid, methacrylic acid, methyl acrylate and vinyl acetate. A suitable technique for preparing useful high pressure ethylene copolymer compositions is described by McKinney et al. in U.S. Pat. No. 4,599,392, the disclosure of which is incorporated herein by reference.

While both high pressure ethylene homopolymers and copolymers are believed to be useful in the first blend, homopolymer polyethylene is generally preferred.

For some applications polystyrene based materials may be preferred to be used as the second polymer in the first blend. GPPS and HIPS have shown to be very immiscible (that is have a high degree of incompatibility) in PBPE. Thus, relatively small amounts, for example 2 to 20 percent by weight) of these polymers may be used with the PBPE and still produce a peelable seal. When clarity is important it is preferred to use less of the polystyrene materials, for example 2-5 percent by weight.

It has also been observed that when materials having a high degree of incompatibility with the PBPE, like the polystyrene based materials, are used, stress whitening occurs when the seal is peeled. Thus these materials can be used to provide tamper evident peelable seals.

The first blend used in embodiments of the present invention will comprise at least a propylene based elastomer or plastomer component and a second polymer such as polystyrene or the polyethylene. The second polymer material will comprise from two to 95 percent by weight of the first blend. When polyethylene is used as the second polymer material, the polyethylene will comprise at least 20 percent by weight, more preferably (for ease of converter processibility) fifty percent by weight, still more preferably 60, still more preferably 75 percent by weight of the first blend. The polyethylene component will preferably comprise less than 95 percent, more preferably less than 85 percent and most preferably less than 80 percent by weight of the first blend.

In case low heat seal initiation temperature, and/or high hot tack strength is desired, it may be preferred to have the polyethylene comprise less than 60 percent, preferably less than 40 percent and even more preferably less than 30 percent of the first blend.

When polystyrene is used as the second polymer the polystyrene will preferably comprise from 2 to 20 percent by weight of the first blend, more preferably from 2 to 10 percent by weight and still more preferably from 2 to 5 percent by weight. The PBPE will comprise at least 5 percent, preferably more than 15 percent, more preferably at least 25 percent by weight of the overall composition. The PBPE will comprise less than 98 percent, by weight of the overall composition.

While the first blend has previously been used to prepare acceptable peelable seal layers, it has been discovered that inline blending a linear low density polyethylene (LLDPE) into the first blend permits the fine tuning of the final peel strength. The addition of at least one LLDPE to the first blend can result in an increase in peel strength of the peelable seal layer. Thus, embodiments of the present invention comprise blending a first blend (such as that described above) with at least one LLDPE to obtain a second blend. The second blend can then be extruded to form a peelable seal layer. The at least one LLDPE can be blended with the first blend using techniques known to those of skill in the art in view of the teachings herein. For example, the at least one LLDPE can be dry blended or melt blended with the first blend to obtain the second blend.

The amount of LLDPE to be included in the second blend can vary, for example, depending on the desired peel strength. Typically, the amount of LLDPE in the second will be from 1 to 20% by weight based on the weight of the second blend. All individual values and subranges from 1 to 20 percent by weight (wt %) are included herein and disclosed herein; for example the amount of the LLDPE can be from a lower limit of 1, 2, 3, 4, 5, 6, 7, 8, 9, 10, 11, 12, 13, or 14 wt % to an upper limit of 5, 6, 7, 8, 9, 10, 11, 12, 13, 14, 15, 16, 17, 18, 19, or 20 wt %. For example, the amount of LLDPE in the second blend can be from 1 to 15 wt %, or in the alternative, from 3 to 12 wt %, or in the alternative, from 3 to 9 wt %, or in the alternative from 3 to 6 wt %.

The LLDPE(s) in the second blend has a density less than or equal to 0.955 g/cc (cm$^3$) in some embodiments. All individual values and subranges less than or equal to 0.955 g/cc are included herein and disclosed herein; for example, the density of the LLDPE(s) can be to an upper limit of 0.955, 0.950, 0.945, 0.940, 0.935, 0.930, 0.925, 0.920 or 0.915 g/cc. In some aspects of the invention, the LLDPE(s) has a density greater than or equal to 0.870 g/cc. All individual values and subranges between 0.870 and 0.955 are included herein and disclosed herein.

The melt index of the at least one LLDPE can depend on a number of factors including whether the film is a blown film or a cast film, the melt index of the first blend, and other factors. For example, for a blown film, melt indices ($I_2$) of 0.1 to 0.4 g/10 minutes, or 0.5 to 3 g/10 mins, or 0.7 to 2 g/10 mins, are desirable. As another example, in general, for a cast film, melt indices ($I_2$) of 1.5 to 8 g/10 minutes, or 2 to 6 g/10 mins, or 2.5 to 4 g/10 mins, are desirable.

In general, any linear low density polyethylene can be used including, for example, Ziegler-Natta catalyzed LLDPE and single site catalyzed LLDPE including, for example, LLDPE formed from bis-metallocene catalysts and constrained geometry catalysts. While Ziegler-Natta catalyzed LLDPE may be preferred due to cost, availability, and other considerations, other LLDPEs can also be used though the relative amount may need to be adjusted. Examples of linear low density polyethylenes that can be used in the second blend include those commercially available from The Dow Chemical Company under the names DOWLEX™, AFFINITY™, ELITE™, and ELITE™ AT.

The seals of the present invention can be made by any process such as blown film, extrusion coating, sheet extrusion, injection molding, or cast film processes. The peelable seal layer can be made in any desired thickness, for example from 1 micron to 3 mm. The sealant layer can be used as a monolayer, but more typically will be one layer of a multilayer structure, for example a 10 micron sealant layer with a 30 micron supporting layer.

Some embodiments of the present invention relate to methods or preparing multilayer films. Such embodiments can comprise coextruding a polymeric resin (e.g., a polyethylene resin) with a blend for a peelable seal layer, wherein the blend for the peelable seal layer comprises any of the first blends described herein and at least one LLDPE. The at least one LLDPE can be any LLDPE as described herein. Likewise, in general, any polymeric resin can be used but persons of skill in the art will recognize that certain polymeric resins may be more suitable than others based on the composition of the peelable seal layer, the intended application, and other factors.

When the sealant layer (particularly a sealant layer comprising a majority of PBPE) is coextruded on a substrate which is PP based then the whole structure will be recyclable.

Peelable seals made from the blends of the present invention will have an aged seal strength of 0.5 to 7 lb/in., 0.5 to 5 lb/in., 0.5 to 4 lb/in., 0.5 to 3 lb/in., preferably 0.5 to 2 lb/in. as determined using a heat seal tester with a 0.5 sec dwell time and a 40 psi bar pressure using Instron pulled at 10 in/min after at least 24 hours of welding seal. It should be understood by one of ordinary skill in the art that the seal strength may typically be somewhat less for flexible packaging and somewhat higher for rigid packaging.

The peelable seals of the present invention will have a heat seal initiation temperature of less than 120° C., preferably less than 110° C., more preferably less than 100° C. The heat seal initiation temperature is defined as the minimum temperature at which the seal strength of 0.5 lb/inch is obtained using a heat seal tester with a 0.5 sec dwell time, with a 40 psi bar pressure pulled on Instron at 10 in/min after 24 hours of welding seal.

It should also be understood that the composition (e.g., the second blend) of the present invention may also contain various additives as is generally known in the art. Examples of such additives include antioxidants, ultraviolet light stabilizers, thermal stabilizers, slip agents, antiblock, pigments or colorants, processing aids (such as fluoropolymers), crosslinking catalysts, flame retardants, fillers, foaming agents, etc.

Embodiments of the present invention relate to peelable seal layers formed by methods of the present invention. Embodiments of the present invention also relate to articles (e.g., multilayer films, packages, flexible packages, etc.) incorporating any of the peelable seal layers described herein. For example, embodiments of the present invention relate to articles incorporating peelable seal layers formed using any of the methods of the present invention.

DSC Method:

Differential scanning calorimetry (DSC) is a common technique that can be used to examine the melting and crystallization of semi-crystalline polymers. General principles of DSC measurements and applications of DSC to studying semi-crystalline polymers are described in standard texts (e.g., E. A. Turi, ed., *Thermal Characterization of Polymeric Materials*, Academic Press, 1981). $T_{me}$ means the temperature at which the melting ends. $T_{max}$ means the peak melting temperature.

Differential Scanning calorimetry (DSC) analysis is determined using a model Q1000 DSC from TA Instruments, Inc. Calibration of the DSC is done as follows. First, a baseline is obtained by running the DSC from −90° C. to 290° C. without any sample in the aluminum DSC pan. Then 7 milligrams of a fresh indium sample is analyzed by heating the sample to 180° C., cooling the sample to 140° C. at a cooling rate of 10° C./min followed by keeping the sample isothermally at 140° C. for 1 minute, followed by heating the sample from 140° C. to 180° C. at a heating rate of 10° C./min. The heat of fusion and the onset of melting of the indium sample are determined and checked to be within 0.5° C. from 156.6° C. for the onset of melting and within 0.5 J/g from 28.71 J/g for the heat of fusion. Then deionized water is analyzed by cooling a small drop of fresh sample in the DSC pan from 25° C. to −30° C. at a cooling rate of 10° C./min. The sample is kept isothermally at −30° C. for 2 minutes and heated to 30° C. at a heating rate of 10° C./min. The onset of melting is determined and checked to be within 0.5° C. from 0° C.

The polymer samples are pressed into a thin film at a temperature of 190° C. About 5 to 8 mg of sample is weighed out and placed in the DSC pan. The lid is crimped on the pan to ensure a closed atmosphere. The sample pan is placed in the DSC cell and then heated at a high rate of about 100° C./min to a temperature of about 60° C. above the melt temperature. The sample is kept at this temperature for about 3 minutes. Then the sample is cooled at a rate of 10° C./min to −40° C., and kept isothermally at that temperature for 3 minutes. The sample is subsequently heated at a rate of 10° C./min until complete melting. The resulting enthalpy curves are analyzed for peak melt temperature, onset and peak crystallization temperatures, heat of fusion and heat of crystallization, $T_{me}$, and any other DSC analyses of interest.

Some embodiments of the invention will now be described in detail in the following Examples.

EXAMPLES

Example 1

In this Example, a series of peelable seal layers with varying amounts of LLDPE are prepared with the compositions shown in Table 1:

TABLE 1

| | Composition of First Blend | Composition of Second Blend | Wt. % LLDPE |
|---|---|---|---|
| Comparative Comp. A | 30% PBPE 68% LDPE 2% Additive | 100% First Blend | 0 |
| Inventive Comp. 1 | 30% PBPE 68% LDPE 2% Additive | 97% First Blend 3% LLDPE | 3 |
| Inventive Comp. 2 | 30% PBPE 68% LDPE 2% Additive | 94% First Blend 6% LLDPE | 6 |
| Inventive Comp. 3 | 30% PBPE 68% LDPE 2% Additive | 91% First Blend 9% LLDPE | 9 |
| Inventive Comp. 4 | 30% PBPE 68% LDPE 2% Additive | 88% First Blend 12% LLDPE | 12 |

The PBPE used in these compositions is VERSIFY™ 2200, having a density of 0.876 g/cm³ and a melt index ($I_2$) of 2.0 g/10 min, which is commercially available from The Dow Chemical Company. The LDPE used in these compositions is DOW™ LDPE 640i, having a density of 0.920 g/cc and a melt index ($I_2$) of 2.0 g/10 min, which is commercially available from The Dow Chemical Company. The Additive used in these compositions is a conventional antiblocking agent. The components of the First Blend are fed into a twin screw compounding extruder and melt compounded to provide the First Blend. The LLDPE used in these compositions is DOWLEX™ 2045G, having a density of 0.920 g/cc and a melt index ($I_2$) of 1.0 g/10 min, which is commercially available from the Dow Chemical Company.

A coextruded 2-layer film sample is produced on an Alpine 7-Layer blown film run by using the same polymer feed in multiple layers represented as layers A/A/A/A/A/B/B with the "B" layer (bottom) being on the inside of the bubble as the sealant layer. The individual feed lines are all 50 mm, 30:1 L/D grooved feed extruders. The "A" layers in these samples is a blend comprising 80% by weight of DOWLEX™ 2045G and 20% by weight of DOW™ LDPE611A. DOW™ LDPE 611A is an LDPE having a density of 0.924 g/cc and a melt index ($I_2$) of 0.88 g/10 min, and is commercially available from The Dow Chemical Company. The "B" layer in each sample was one of the compositions identified in Table 1 to provide Comparative Film 1, Inventive Film 1, Inventive Film 2, Inventive Film 3, and Inventive Film 4, depending on which of the Table 1 compositions was used for the "B" layers. Additional details regarding the extrusion are provided in Table 2.

TABLE 2

| Description | Unit | Comp. Film A | Inv. Film 1 | Inv. Film 2 | Inv. Film 3 | Inv. Film 4 |
|---|---|---|---|---|---|---|
| Actual Gauge | mil | 1.6 | 1.6 | 1.6 | 1.6 | 1.6 |
| Actual Rate (per in. of circ. of die) | lbs | 12.9 | 12.9 | 12.9 | 12.9 | 12.9 |
| Blow-up Ratio | | 2.5 | 2.5 | 2.5 | 2.5 | 2.5 |
| Corona Treating | dynes | 42.0 | 42.0 | 42.0 | 42.0 | 42.0 |
| Die Size | inches | 9.8 | 9.8 | 9.8 | 9.8 | 9.8 |
| Die Gap | mils | 78.7 | 78.7 | 78.7 | 78.7 | 78.7 |
| Draw-down Ratio | | 19.6 | 19.6 | 19.6 | 19.6 | 19.6 |
| Film Gauge | mil | 1.6 | 1.6 | 1.6 | 1.6 | 1.6 |
| Frostline Height | inches | 37.0 | 37.0 | 37.0 | 37.0 | 37.0 |
| Line Speed | ft/min | 135.2 | 135.1 | 134.9 | 135.3 | 134.9 |
| Melt Temp. Extruder 1 | ° C. | 467.2 | 467.9 | 467.8 | 467.9 | 468.4 |
| Melt Temp. Extruder 2 | ° C. | 465.1 | 465.9 | 465.9 | 465.8 | 466.2 |
| Melt Temp. Extruder 3 | ° C. | 463.3 | 466.1 | 466.1 | 465.7 | 466.4 |
| Melt Temp. Extruder 4 | ° C. | 459.0 | 460.7 | 460.5 | 460.5 | 461.1 |
| Melt Temp. Extruder 5 | ° C. | 452.6 | 453.8 | 453.0 | 452.8 | 453.6 |
| Melt Temp. Extruder 6 | ° C. | 457.0 | 456.8 | 457.2 | 459.0 | 459.1 |
| Melt Temp. Extruder 7 | ° C. | 432.7 | 433.1 | 434.4 | 435.6 | 435.5 |
| Output | lb/hr | 399.6 | 399.5 | 399.1 | 400.0 | 399.2 |

Each of the peelable seal films is then laminated to a 48 gauge oriented polyester film. The adhesive used for lamination is MOR-FREE™ 403A/MOR-FREE™ C-411 which is a solventless, two-component polyurethane adhesive system from The Dow Chemical Company. The adhesive is applied at 1.5-1.75 lb/ream.

The laminated films are tested by ASTM heat seal and hot tack tests to assess change in peel strength. The relevant details of these tests are as follows:

Heat Seal Test:

Heat seal measurements on the film are performed on a commercial tensile testing machine according to ASTM F-88 (Technique A). The heat seal test is a gauge of the strength of seals (seal strength) in flexible barrier materials. It does this by measuring the force required to separate a test strip of material containing the seal and identifies the mode of specimen failure. Seal strength is relevant to the opening force and package integrity. Prior to cutting, the films are conditioned for a minimum of 40 hours at 23° C. (±2° C.) and 50% (±5%) R.H. (relative humidity) per ASTM D-618 (procedure A). Sheets are then cut from the three-layer coextruded laminated film in the machine direction to a length of approximately 11 inches and a width of approximately 8.5 inches. The sheets are heat sealed across the machine direction on a Kopp Heat Sealer over a range of temperatures under the following conditions:

Sealing Pressure: 0.275 N/mm$^2$
Sealing Dwell Time: 0.5 s

The temperature range is approximately given by the hot tack range (i.e., the temperature range over which at least a minimum hot tack seal is achieved and prior to the burn-through temperature).

The sealed sheets are conditioned for a minimum of 3 hours at 23° C. (±2° C.) and 50% R.H (±5%) prior to cutting into one inch wide strips. These strips are then further conditioned for a minimum of 21 hours at 23° C. (±2° C.) and 50% R.H (±5%) prior to testing.

For testing, the strips are loaded into the grips of a tensile testing machine at an initial separation of 2 inches and pulled at a grip separation rate of 10 inches/min at 23° C. (±2° C.) and 50% R.H (±5%). The strips are tested unsupported. Six replicate tests are performed for each sealing temperature. The data reported are peak load, strain at peak load and failure mode.

Table 3 shows the average peak load over a range of temperatures for each of the peelable seal layers used in the samples. As shown in Table 3, the peel strength (as evidenced by average peak load) generally increases with increasing amounts of LLDPE in the peelable seal layer (the "B" layer in the films).

TABLE 3

| Property | Units | Comp. Film A | Inv. Film 1 | Inv. Film 2 | Inv. Film 3 | Inv. Film 4 |
|---|---|---|---|---|---|---|
| Avg. Peak Load | lb | 1.2 | 1.2 | 1.8 | 1.7 | 1.4 |
| Std. Dev. | lb | 0.0 | 0.0 | 0.1 | 0.1 | 0.1 |
| Test Temperature | ° C. | 150.0 | 150.0 | 150.0 | 150.0 | 150.0 |
| Avg. Peak Load | lb | 1.4 | 1.3 | 3.1 | 1.9 | 1.5 |
| Std. Dev. | lb | 0.3 | 0.0 | 1.4 | 0.1 | 0.2 |
| Test Temperature | ° C. | 140.0 | 140.0 | 140.0 | 140.0 | 140.0 |
| Avg. Peak Load | lb | 1.2 | 1.3 | 5.5 | 1.9 | 1.5 |
| Std. Dev. | lb | 0.1 | 0.0 | 2.2 | 0.0 | 0.0 |
| Test Temperature | ° C. | 130.0 | 130.0 | 130.0 | 130.0 | 130.0 |
| Avg. Peak Load | lb | 1.2 | 1.4 | 2.1 | 2.1 | 1.5 |
| Std. Dev. | lb | 0.0 | 0.1 | 0.0 | 0.1 | 0.1 |
| Test Temperature | ° C. | 120.0 | 120.0 | 120.0 | 120.0 | 120.0 |
| Avg. Peak Load | lb | 1.2 | 1.3 | 2.4 | 2.6 | 1.5 |
| Std. Dev. | lb | 0.0 | 0.2 | 0.4 | 0.5 | 0.1 |
| Test Temperature | ° C. | 110.0 | 110.0 | 110.0 | 110.0 | 110.0 |
| Avg. Peak Load | lb | 1.0 | 1.0 | 1.2 | 1.1 | 1.1 |
| Std. Dev. | lb | 0.1 | 0.1 | 0.1 | 0.1 | 0.1 |
| Test Temperature | ° C. | 100.0 | 100.0 | 100.0 | 100.0 | 100.0 |
| Avg. Peak Load | lb | 0.2 | 0.2 | 0.2 | 0.1 | 0.2 |
| Std. Dev. | lb | 0.0 | 0.0 | 0.0 | 0.1 | 0.1 |
| Test Temperature | ° C. | 90.0 | 90.0 | 90.0 | 90.0 | 90.0 |

TABLE 3-continued

| Property | Units | Comp. Film A | Inv. Film 1 | Inv. Film 2 | Inv. Film 3 | Inv. Film 4 |
|---|---|---|---|---|---|---|
| Avg. Peak Load | lb | 0.0 | 0.0 | 0.0 | 0.0 | 0.0 |
| Std. Dev. | lb | 0.0 | 0.0 | 0.0 | 0.0 | 0.0 |
| Test Temperature | ° C. | 80.0 | 80.0 | 80.0 | 80.0 | 80.0 |

Hot Tack Test:

Hot tack measurements on the films are performed using an Enepay commercial testing machine according to ASTM F-1921 (Method B). Prior to testing, the films are conditioned for a minimum of 40 hours at 23° C. and 50% R.H. per ASTM D-618 (Procedure A). The hot tack test simulates the filling of material into a pouch or bag before the seal has had a chance to cool completely.

Sheets of dimensions 8.5" by 14" are cut from the three-layer coextruded laminated films, with the longest dimension in the machine direction. 1" by 14" strips are cut from each film. Tests are performed on these samples over a range of temperatures and the results are reported as the maximum load as a function of temperature. Typical temperature steps are 5° C. or 10° C. with 6 replicates performed at each temperature. The parameters used in the test are as follows:

Specimen Width: 25.4 mm (1.0 in)
Sealing Pressure: 0.275 N/mm²
Sealing Dwell Time: 0.5 s
Delay time: 0.18 s
Peel speed: 200 mm/s The Enepay machines make 0.5 inch seals. The data are reported as average hot tack where average hot tack force (N) is reported as a function of temperature, as for example shown in Table 4. The hot tack initiation temperature is the temperature required to achieve a pre-defined minimum hot tack force. This force is typically in the 1-2N range, but will vary depending on the specific application. The ultimate hot tack strength is the peak in the hot tack curve. The hot tack range is the range in temperature at which the seal strength exceeds the minimum hot tack force.

Table 4 shows the average hot tack over a range of temperatures for each of the peelable seal layers used in the samples. As shown in Table 4, the hot tack strength (as evidenced by average hot tack) generally increases with increasing amounts of LLDPE in the peelable seal layer (the "B" layer in the films).

TABLE 4

| Property | Units | Comp. Comp. A | Inv. Comp. 1 | Inv. Comp. 2 | Inv. Comp. 3 | Inv. Comp. 4 |
|---|---|---|---|---|---|---|
| Avg. Hot Tack | N | 1.9 | 2.1 | 2.3 | 2.6 | 2.7 |
| Std. Dev. | N | 0.1 | 0.1 | 0.1 | 0.2 | 0.3 |
| Test Temperature | ° C. | 160.0 | 160.0 | 160.0 | 160.0 | 160.0 |
| Avg. Hot Tack | N | | 3.2 | 3.2 | 3.8 | 4.6 |
| Std. Dev. | N | | 0.5 | 0.4 | 0.4 | 0.8 |
| Test Temperature | ° C. | | 150.0 | 150.0 | 150.0 | 150.0 |
| Avg. Hot Tack | N | 3.7 | 4.6 | 5.4 | 5.6 | 6.2 |
| Std. Dev. | N | 0.4 | 0.1 | 0.3 | 0.2 | 0.2 |
| Test Temperature | ° C. | 140.0 | 140.0 | 140.0 | 140.0 | 140.0 |
| Avg. Hot Tack | N | 4.2 | 5.3 | 5.4 | 5.2 | 5.6 |
| Std. Dev. | N | 0.2 | 0.1 | 0.5 | 0.4 | 0.2 |
| Test Temperature | ° C. | 130.0 | 130.0 | 130.0 | 130.0 | 130.0 |
| Avg. Hot Tack | N | 4.0 | 4.4 | 4.6 | 4.9 | 5.6 |
| Std. Dev. | N | 0.2 | 0.2 | 0.2 | 0.3 | 0.2 |
| Test Temperature | ° C. | 120.0 | 120.0 | 120.0 | 120.0 | 120.0 |
| Avg. Hot Tack | N | 4.3 | 4.5 | 4.8 | 5.1 | 5.8 |
| Std. Dev. | N | 0.3 | 0.4 | 0.3 | 0.3 | 0.3 |
| Test Temperature | ° C. | 110.0 | 110.0 | 110.0 | 110.0 | 110.0 |
| Avg. Hot Tack | N | 5.1 | 5.3 | 5.7 | 5.5 | 6.2 |
| Std. Dev. | N | 0.3 | 0.2 | 0.1 | 0.1 | 0.5 |
| Test Temperature | ° C. | 100.0 | 100.0 | 100.0 | 100.0 | 100.0 |
| Avg. Hot Tack | N | 3.9 | 4.8 | 3.9 | 3.4 | 4.6 |
| Std. Dev. | N | 0.5 | 0.3 | 0.5 | 0.5 | 0.7 |
| Test Temperature | ° C. | 90.0 | 90.0 | 90.0 | 90.0 | 90.0 |
| Avg. Hot Tack | N | 0.3 | 0.3 | 0.2 | 0.3 | 0.3 |
| Std. Dev. | N | 0.1 | 0.1 | 0.0 | 0.1 | 0.1 |
| Test Temperature | ° C. | 80.0 | 80.0 | 80.0 | 80.0 | 80.0 |

Example 2

In this Example, Comparative Composition A, Inventive Composition 2, and Inventive Composition 4 from Example 1 are prepared and measured again. This Example also evaluated Inventive Compositions 5 and 6 which are as follows:

TABLE 5

| | Composition of First Blend | Composition of Second Blend | Wt. % LLDPE |
|---|---|---|---|
| Inventive Comp. 5 | 30% PBPE 68% LDPE 2% Additive | 94% First Blend 6% LLDPE | 6 |

TABLE 5-continued

|  | Composition of First Blend | Composition of Second Blend | Wt. % LLDPE |
|---|---|---|---|
| Inventive Comp. 6 | 30% PBPE 68% LDPE 2% Additive | 88% First Blend 12% LLDPE | 12 |

The PBPE used in these compositions is VERSIFY™ 2200, having a density of 0.876 g/cm³ and a melt index ($I_2$) of 2.0 g/10 min, which is commercially available from The Dow Chemical Company. The LDPE used in these compositions is DOW™ LDPE 640i, having a density of 0.920 g/cc and a melt index ($I_2$) of 2.0 g/10 min, which is commercially available from The Dow Chemical Company. The Additive used in these compositions is a conventional antiblocking agent. The components in the First Blend are not melt compounded prior to supply to the blown film run. The LLDPE used in these compositions is DOWLEX™ 2045G, having a density of 0.920 g/cc and a melt index ($I_2$) of 1.0 g/10 min, which is commercially available from the Dow Chemical Company.

A coextruded 2-layer film sample was produced on an Alpine 7-Layer blown film run by using the same polymer feed in multiple layers represented as layers A/A/A/A/A/B/B with the "B" layer (bottom) being in the inside of the bubble as the sealant layer. The 2-layer structure is achieved by combining the "A" and "B". The individual feed lines are all 50 mm, 30:1 L/D grooved feed extruders. The "A" layers in these samples is a blend comprising 80% by weight of DOWLEX™ 2045G and 20% by weight of DOW™ LDPE611A. The "B" layer in each sample is one of the compositions identified in Table 1 to provide Comparative Film 1, Inventive Film 2 Repeat, and Inventive Film 4 Repeat, and one of the compositions identified in Table 5 to provide Inventive Film 5, and Inventive Film 6, depending on which of the Table 1 or Table 5 compositions is used for the "B" layers. The composition of Inventive Films 5 and 6 are blended at the blown film line by means of dry blending. Blenders for the "B" layers (per Table 5) are used to dose specific amounts of LLDPE (as defined in Table 5) to make up the sealant layer composition.

Additional details regarding the extrusion are provided in Table 6.

TABLE 6

| Description | Unit | Comp. Film A | Inv. Film 2 Repeat | Inv. Film 4 Repeat | Inv. Film 5 | Inv. Film 6 |
|---|---|---|---|---|---|---|
| Actual Gauge | mil | 1.6 | 1.6 | 1.6 | 1.6 | 1.6 |
| Actual Rate (per in. of circ. of die) | lbs | 12.9 | 12.9 | 13.0 | 12.9 | 12.9 |
| Blow-up Ratio |  | 2.5 | 2.5 | 2.5 | 2.5 | 2.5 |
| Corona Treating | dynes | 42.0 | 42.0 | 42.0 | 42.0 | 42.0 |
| Die Size | inches | 9.8 | 9.8 | 9.8 | 9.8 | 9.8 |
| Die Gap | mils | 78.7 | 78.7 | 78.7 | 78.7 | 78.7 |
| Draw-down Ratio |  | 19.6 | 19.6 | 19.6 | 19.6 | 19.6 |
| Film Gauge | mil | 1.6 | 1.6 | 1.6 | 1.6 | 1.6 |
| Frostline Height | inches | 37.0 | 37.0 | 37.0 |  |  |
| Line Speed | ft/min | 135.2 | 135.2 | 135.4 | 134.5 | 134.5 |
| Melt Temp. Extruder 1 | ° C. | 467.2 | 468.3 | 468.6 | 469.0 | 469.2 |
| Melt Temp. Extruder 2 | ° C. | 465.1 | 462.9 | 463.3 | 463.0 | 462.8 |
| Melt Temp. Extruder 3 | ° C. | 463.3 | 467.9 | 469.2 | 469.6 | 469.5 |
| Melt Temp. Extruder 4 | ° C. | 459.0 | 455.1 | 455.7 | 455.9 | 456.4 |
| Melt Temp. Extruder 5 | ° C. | 452.6 | 450.3 | 451.4 | 451.0 | 450.8 |
| Melt Temp. Extruder 6 | ° C. | 457.0 | 457.4 | 458.6 | 460.9 | 462.8 |
| Melt Temp. Extruder 7 | ° C. | 432.7 | 434.0 | 435.8 | 437.8 | 440.3 |
| Output | lb/hr | 399.6 | 399.6 | 400.5 | 398.7 | 398.3 |

Each of the peelable seal films is then laminated to a 48 gauge oriented polyester film. The adhesive used for lamination is MOR-FREE™ 403A/MOR-FREE™ C-411 which is a solventless, two-component polyurethane adhesive system from The Dow Chemical Company. The adhesive is applied at 1.5-1.75 lb/ream.

The laminated films are evaluated using the ASTM heat seal and hot tack tests to assess change in peel strength as described above.

Table 7 shows the average peak load over a range of temperatures for each of the peelable seal layers used in the samples. As shown in Table 7, the peel strength (as evidenced by average peak load) generally increases with increasing amounts of LLDPE in the peelable seal layer (the "B" layer in the films). Also, blending the three components (PBPE, LDPE, LLDPE) at the blown film line (as done for Inventive Compositions 5 and 6), while still increasing peel strength, appears to result in a more inconsistent peel strength.

TABLE 7

| Property | Units | Comp. Film A | Inv. Film 2 Repeat | Inv. Film 4 Repeat | Inv. Film 5 | Inv. Film 6 |
|---|---|---|---|---|---|---|
| Avg. Peak Load | lb | 1.2 | 1.6 | 2.4 | 1.4 | 3.3 |
| Std. Dev. | lb | 0.1 | 0.1 | 0.3 | 0.1 | 0.7 |
| Test Temperature | ° C. | 150.0 | 150.0 | 150.0 | 150.0 | 150.0 |
| Avg. Peak Load | lb | 1.4 | 1.7 | 2.6 | 1.4 | 2.8 |
| Std. Dev. | lb | 0.3 | 0.2 | 1.0 | 0.1 | 0.6 |
| Test Temperature | ° C. | 140.0 | 140.0 | 140.0 | 140.0 | 140.0 |
| Avg. Peak Load | lb | 1.2 | 2.3 | 2.8 | 1.5 | 2.0 |
| Std. Dev. | lb | 0.0 | 1.6 | 1.9 | 0.1 | 0.4 |
| Test Temperature | ° C. | 130.0 | 130.0 | 130.0 | 130.0 | 130.0 |
| Avg. Peak Load | lb | 1.5 | 1.7 | 2.1 | 1.6 | 2.3 |
| Std. Dev. | lb | 0.4 | 0.4 | 0.1 | 0.3 | 0.3 |
| Test Temperature | ° C. | 120.0 | 120.0 | 120.0 | 120.0 | 120.0 |
| Avg. Peak Load | lb | 1.2 | 1.5 | 1.9 | 1.6 | 3.1 |
| Std. Dev. | lb | 0.1 | 0.1 | 0.3 | 0.1 | 1.4 |
| Test Temperature | ° C. | 110.0 | 110.0 | 110.0 | 110.0 | 110.0 |
| Avg. Peak Load | lb | 1.1 | 1.1 | 1.3 | 1.2 | 1.2 |
| Std. Dev. | lb | 0.1 | 0.1 | 0.2 | 0.2 | 0.3 |
| Test Temperature | ° C. | 100.0 | 100.0 | 100.0 | 100.0 | 100.0 |
| Avg. Peak Load | lb | 0.1 | 0.1 | 0.1 | 0.4 | 0.2 |
| Std. Dev. | lb | 0.1 | 0.0 | 0.1 | 0.2 | 0.1 |
| Test Temperature | ° C. | 90.0 | 90.0 | 90.0 | 90.0 | 90.0 |
| Avg. Peak Load | lb | 0.0 | 0.0 | 0.0 | 0.0 | 0.0 |
| Std. Dev. | lb | 0.0 | 0.0 | 0.0 | 0.0 | 0.0 |
| Test Temperature | ° C. | 80.0 | 80.0 | 80.0 | 80.0 | 80.0 |

Table 8 shows the average hot tack over a range of temperatures for each of the peelable seal layers used in the samples. As shown in Table 8, the hot tack strength (as evidenced by average hot tack) generally increases with increasing amounts of LLDPE in the peelable seal layer (the "B" layers in the films).

TABLE 8

| Property | Units | Comp. Comp. A | Inv. Film 2 Repeat | Inv. Film 4 Repeat | Inv. Comp. 5 | Inv. Comp. 6 |
|---|---|---|---|---|---|---|
| Avg. Hot Tack | N | 1.9 | 2.2 | 2.7 | 2.0 | 1.8 |
| Std. Dev. | N | 0.1 | 0.1 | 0.1 | 0.1 | 0.1 |
| Test Temperature | ° C. | 160.0 | 160.0 | 160.0 | 160.0 | 160.0 |
| Avg. Hot Tack | N | 2.4 | 30. | 4.3 | 2.7 | 2.3 |
| Std. Dev. | N | 0.2 | 0.3 | 0.3 | 0.1 | 0.1 |
| Test Temperature | ° C. | 150.0 | 150.0 | 150.0 | 150.0 | 150.0 |
| Avg. Hot Tack | N | 4.1 | 5.3 | 5.8 | 4.4 | 3.8 |
| Std. Dev. | N | 0.2 | 0.2 | 0.4 | 0.3 | 0.6 |
| Test Temperature | ° C. | 140.0 | 140.0 | 140.0 | 140.0 | 140.0 |
| Avg. Hot Tack | N | 4.1 | 4.6 | 5.9 | 5.5 | 4.2 |
| Std. Dev. | N | 0.5 | 0.2 | 0.2 | 0.3 | 0.4 |
| Test Temperature | ° C. | 130.0 | 130.0 | 130.0 | 130.0 | 130.0 |
| Avg. Hot Tack | N | 4.0 | 5.0 | 5.3 | 4.2 | 4.1 |
| Std. Dev. | N | 0.2 | 0.1 | 0.2 | 0.3 | 0.2 |
| Test Temperature | ° C. | 120.0 | 120.0 | 120.0 | 120.0 | 120.0 |
| Avg. Hot Tack | N | 4.3 | 5.2 | 5.1 | 3.0 | 4.6 |
| Std. Dev. | N | 0.1 | 0.4 | 0.3 | 0.1 | 0.2 |
| Test Temperature | ° C. | 110.0 | 110.0 | 110.0 | 110.0 | 110.0 |
| Avg. Hot Tack | N | 5.0 | 5.8 | 5.9 | 3.2 | 4.8 |
| Std. Dev. | N | 0.1 | 0.3 | 0.2 | 0.2 | 0.3 |
| Test Temperature | ° C. | 100.0 | 100.0 | 100.0 | 100.0 | 100.0 |
| Avg. Hot Tack | N | 4.4 | 4.3 | 4.8 | 3.6 | 4.3 |
| Std. Dev. | N | 0.2 | 0.6 | 0.2 | 0.3 | 0.6 |
| Test Temperature | ° C. | 90.0 | 90.0 | 90.0 | 90.0 | 90.0 |
| Avg. Hot Tack | N | 0.3 | 0.3 | 0.4 | 2.8 | 0.3 |
| Std. Dev. | N | 0.0 | 0.1 | 0.1 | 0.2 | 0.1 |
| Test Temperature | ° C. | 80.0 | 80.0 | 80.0 | 80.0 | 80.0 |

The invention claimed is:

1. A method of preparing a peelable seal layer comprising:
   (a) providing a first blend comprising (i) from 5 to 98 percent by weight of a reactor grade propylene based plastomer or elastomer having a molecular weight distribution of less than 3.5 and a density of less than 0.89 g/cc; and (ii) from 2 to 95 percent by weight of a second polymer selected from the group consisting of low density polyethylene, ultra or very low density polyethylene, high density polyethylene, ethylene vinyl acetate, and mixtures thereof, wherein the first blend is a sealant resin;
   (b) providing at least one linear low density polyethylene;
   (c) blending the first blend with the at least one linear low density polyethylene to obtain a second blend; and
   (d) extruding the second blend to form a peelable seal layer, wherein the peelable seal layer has a heat seal initiation temperature less than 120° C. when sealed at a bar pressure of 40 psi with a dwell time of 0.5 seconds, and wherein the second blend comprises from 1% to 20% by weight of the linear low density polyethylene blended with the first blend.

2. The method of claim 1 wherein the second blend comprises 15% or less by weight of the linear low density polyethylene from step (b).

3. The method of claim 1 wherein the first blend and the linear low density polyethylene from step (b) are dry blended or melt blended.

4. The method of claim 1 wherein extruding the second blend to form a peelable seal layer comprises coextruding the second blend with at least one polyolefin to form a multilayer film.

5. The method of claim 4, wherein the at least one polyolefin comprises polyethylene.

6. The method of claim 1 wherein the seal layer has a seal strength in the range of 0.5 to 4 lb/in.

7. The method of claim 1 wherein the second polymer is a low density polyethylene.

8. The method of claim 7, wherein the low density polyethylene comprises 10 to 40 percent by weight of the first blend.

9. The method of claim 1 wherein the propylene based elastomer or plastomer contains from 5% to 15% by weight of units derived from ethylene based on the weight of the propylene based elastomer or plastomer.

10. A peelable seal layer made by the method of claim 1.

11. A multilayer film comprising a peelable seal layer made by the method of claim 1.

12. A method of preparing a multilayer film comprising:
(a) providing a polymeric resin comprising polyethylene;
(b) providing a blend for a peelable seal layer formed by
(1) providing a first blend comprising (i) from 5 to 98 percent by weight of a reactor grade propylene based plastomer or elastomer having a molecular weight distribution of less than 3.5 and a density of less than 0.89 g/cc; and (ii) from 2 to 95 percent by weight of a second polymer selected from the group consisting of low density polyethylene, ultra or very low density polyethylene, high density polyethylene, ethylene vinyl acetate, and mixtures thereof, wherein the first blend is a sealant resin; (2) providing at least one linear low density polyethylene; and (3) blending the first blend with the at least one linear low density polyethylene to obtain the peelable seal layer blend, wherein the peelable seal layer blend comprises from 1% to 20% by weight of the linear low density polyethylene blended with the first blend; and
(c) coextruding the polymeric resin and the peelable seal layer blend to obtain a multilayer film,
wherein the peelable seal layer has a heat seal initiation temperature less than 120° C. when sealed at a bar pressure of 40 psi with a dwell time of 0.5 seconds.

13. A multilayer film made by the method of claim 12.

* * * * *